United States Patent
Zaw et al.

(10) Patent No.: US 9,171,574 B1
(45) Date of Patent: Oct. 27, 2015

(54) SHINGLED BAND WITH A CACHE TRACK

(71) Applicant: Seagate Technology LLC, Cupertino, CA (US)

(72) Inventors: Thein Than Zaw, Singapore (SG); Shen Feng, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/087,916

(22) Filed: Nov. 22, 2013

(51) Int. Cl.
*G11B 5/09* (2006.01)
*G11B 20/12* (2006.01)
*G11B 27/30* (2006.01)
*G11B 20/10* (2006.01)
*G11B 5/012* (2006.01)

(52) U.S. Cl.
CPC .......... *G11B 20/1262* (2013.01); *G11B 5/012* (2013.01); *G11B 20/10009* (2013.01); *G11B 27/3027* (2013.01)

(58) Field of Classification Search
None
See application file for complete search history.

(56) References Cited

U.S. PATENT DOCUMENTS 8,537,481 B1   9/2013  Bandic
2012/0300326 A1*  11/2012  Hall .............................. 360/15

OTHER PUBLICATIONS

Gibson, Directions for Shingled-Write and Two-Dimensional Magnetic Recording System Architectures: Synergies with Solid-State Disks, May 1, 2009, Carnegie Mellon University.
Amer et al., Design Issues for a Shingled Write Disk System, 2010.

* cited by examiner

*Primary Examiner* — Muhammad N Edun
(74) *Attorney, Agent, or Firm* — Cesari & Reed LLP; Kirk A. Cesari; Christian W. Best

(57) ABSTRACT

A disc data storage medium can include a shingled band of tracks, some of which do not map to host accessible logical block address. The tracks that do not map to host accessible logical block addresses (cache tracks) can store cache data and may map to disc accessible logical block addresses. Data operations can be performed on the data in the cache tracks, and the data may then be moved to storage regions mapped to host logical block addresses.

20 Claims, 8 Drawing Sheets

SHINGLED BAND WITH A CACHE TRACK

SUMMARY

In certain embodiments, an apparatus may comprise a data storage medium with at least one last track of a shingled band of tracks configured as a randomly writeable track that does not map to host accessible logical block addresses (HLBAs). Further, a shingled portion of the shingled band of tracks has HLBAs assigned thereto.

In certain embodiments, an apparatus may comprise a data storage medium having a shingled band of tracks. The tracks can include a shingled portion with at least one track partially overlapped by a following adjacent track. Further, the last track can overlap a preceding adjacent track but is not overlapped by a following adjacent track, and the last track does not have host accessible block addresses mapped thereto.

In certain embodiments, a method may comprise designating at least one last track of a shingled band of tracks on a data storage medium as a randomly writeable track that does not map to host accessible logical block addresses (HLBAs), and where a shingled portion of the shingled band of tracks does have HLBAs assigned thereto.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The present disclosure generally relates to data storage systems, such as disc memory. Specifically, the present disclosure relates to a shingled band with a cache track.

Shingled magnetic recording (SMR) is a method of executing a write operation in one radial direction across a disc, where a portion of the tracks partially overlap each other in a manner similar to roofing shingles. Writing to a track in an SMR disc can corrupt data in a subsequent track (e.g. writing to track t0 can corrupt track t1); however, writing to a track may not corrupt a previous track (e.g. writing to track t1 may not corrupt track t0). Thus, writing to shingled tracks may require a different writing strategy than with non-shingled tracks because writing random data (e.g. data frequently accessed or modified) to shingled tracks can be detrimental to the performance of a data storage device.

Figure 1:
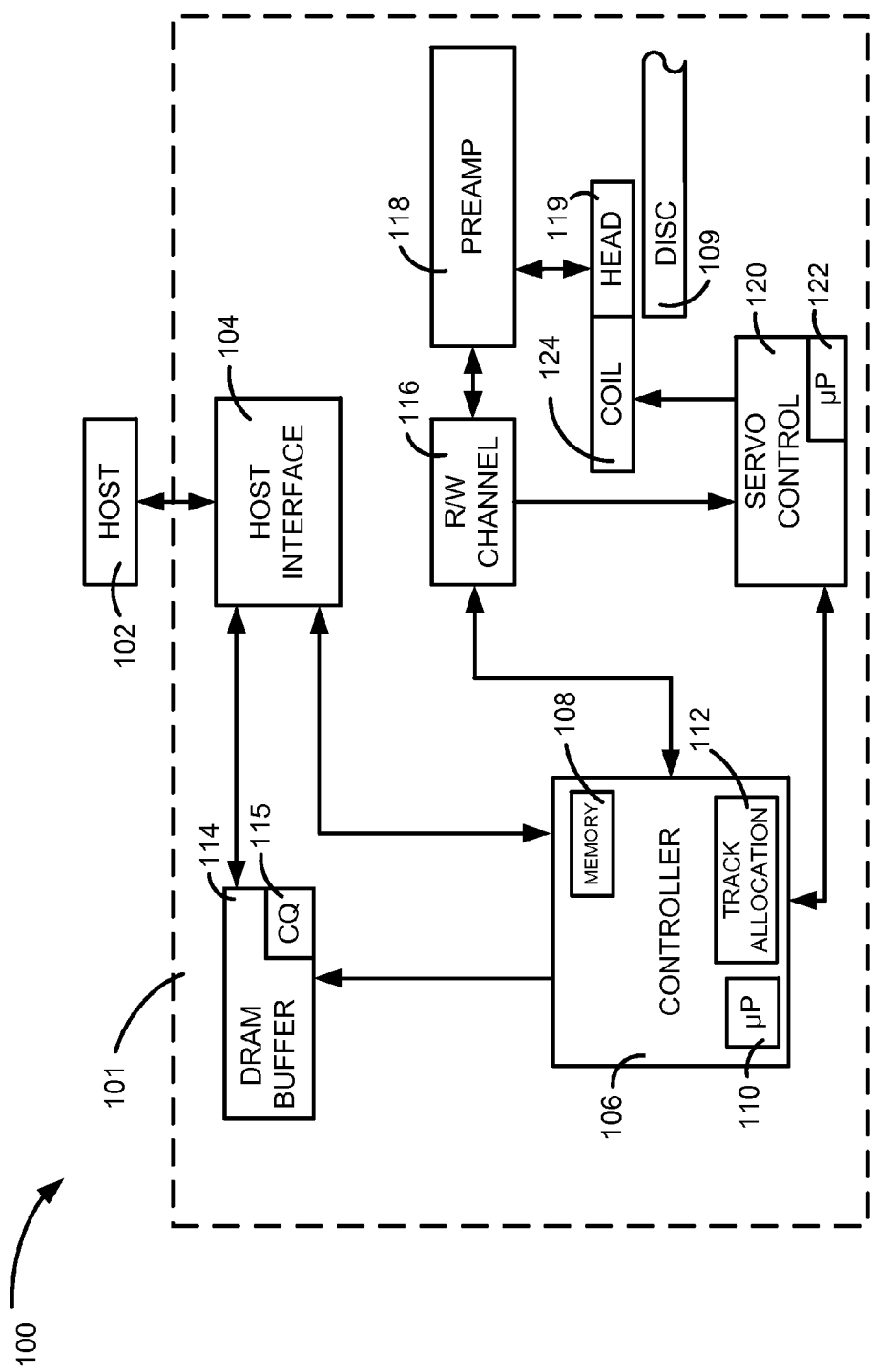
FIG. 1 is a diagram of a shingled band with a cache track, in accordance with certain embodiments of the present disclosure.

FIG. 1 depicts a system with a shingled band with a cache track, and is generally designated 100. Specifically, the system 100 provides a functional block diagram of a data storage device (DSD). The DSD 101 can optionally connect to be removable from a host device 102, which can be a desktop computer, a laptop computer, a server, a telephone, a music player, another electronic device, or any combination thereof. The data storage device 101 can communicate with the host device 102 via the hardware/firmware based host interface circuit 104 that may include a connector (not shown) which can allow the DSD 101 to be physically removed from the host 102.

The DSD 101 can include a programmable controller 106 with associated memory 108, track allocation circuit(s) 112, and processor 110. The programmable controller 106 may be part of a system on chip (SOC). The track allocation circuit(s) 112, which may include a firmware module, can allocate one or more tracks on the disc 109 as storage locations not readily accessible to the host 102. Further, the track allocation circuit(s) 112 may be integrated into other circuits, such as the read/write (R/W) channel 116, a host interface 104, be implemented via software instructions executable by a processor, or any combination thereof. In addition, the track allocation circuit(s) 112 can manage host accessible logical block address (HLBA) and drive accessible logical block address (DLBA) mappings to tracks on the disc 109. A buffer 114 can temporarily store user data during read and write operations and can include a command queue (CQ) 115 where multiple access operations can be temporarily stored pending execution. The (R/W) channel 116 can encode data during write operations and reconstruct user data during read operations. A preamplifier/driver circuit (preamp) 118 can apply write currents to the head(s) 119 and can provide pre-amplification of readback signals. A servo control circuit 120 may use servo data from a servo sector to provide the appropriate current to the voice coil motor 124 to position the head(s) 119 over disc(s) 109. The controller 106 can communicate with a processor 122 to move the head(s) 119 to the desired locations on the disc(s) 109 during execution of various pending commands in the command queue 113 or during other operations. The channel configurations and systems described herein may be implemented in the R/W channel 116 as hardware circuits, software, memory, or any combination thereof.

Figure 2:
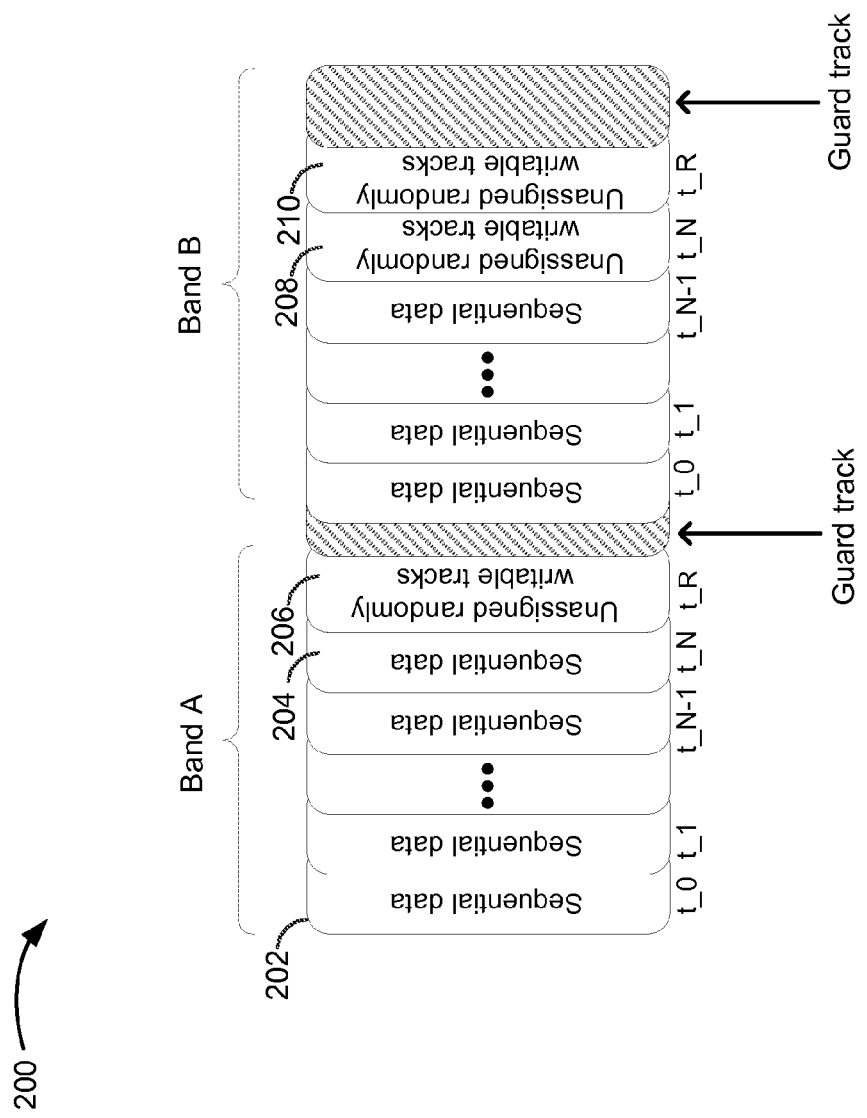
FIG. 2 is a diagram of a shingled band with a cache track, in accordance with certain embodiments of the present disclosure.

Referring to FIG. 2, a diagram of a shingled band with a cache track is shown and generally designated 200. A band in an SMR system can include sequential data tracks, unassigned randomly writable tracks (e.g. cache tracks), and guard tracks, all of which may be overlapping. When an unassigned randomly writable track is located at the end of the band (e.g. the last track of the band), write operations may not corrupt other data tracks, and thus a read-modify-write (RMW) operation may not be necessary. An example of a type of data that may be stored to unassigned randomly writable tracks can be cache data; cache data may be random, non-sequential, or sequential.

Sequential data tracks can store non-random data, although other types of data may be stored as well. Further, sequential tracks may be the inner tracks of the band, although in some circumstances, such as when no track is allocated for storing cache data, the last tracks may be sequential tracks. Guard tracks can be regions on the disc of varying widths, which may be located after the last data track, which may separate data bands.

Referring to system 200, Band A can have data tracks starting at t_0 and ending at t_R. Tracks t_0 202 through t_N 204 can be assigned to store sequential data (e.g. non-cache data), while the last track, t_R 206, can be assigned to store cache data. In some embodiments, more than one track can be allocated to store cache data. For example, the last two tracks of Band B (t_N 208 and t_R 210) may both store cache data.

Figure 3:
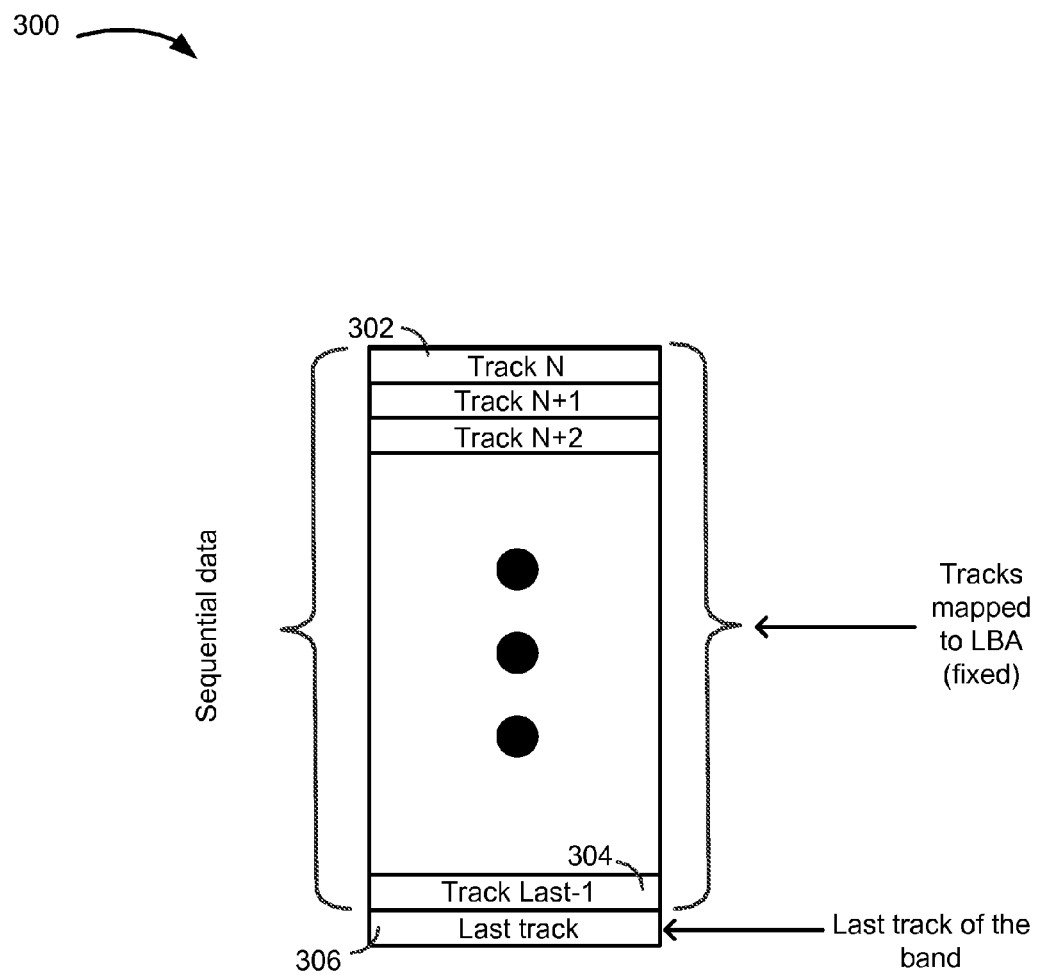
FIG. 3 is a diagram of a shingled band with a cache track, in accordance with certain embodiments of the present disclosure.

Referring to FIG. 3, a diagram of a shingled band with a cache track is shown and generally designated 300, and may be another embodiment of the system 200. A shingled band can contain tracks for storing data, some of which may be sequential writable and some which may be randomly writable tracks. In some examples, the randomly writable tracks may have no HLBAs assigned. For example, tracks N 302 to track last-1 304 may be sequential tracks, while the last track 306 may be an unassigned randomly writable track. In some embodiments, however, more than one track may be an unassigned randomly writable track (e.g. track last-1 304, last-2, and so forth).

Data stored on a data storage device may be located at a physical block address (PBA), which can be a physical location on a storage device (e.g. non-volatile solid state memory, head, sector, band, track, etc.). The PBAs can be mapped to host accessible logical block addresses (HLBAs), which may be accessible to a host, via an HLBA table. When the host needs to access data, it can request access to an HLBA ranges(s) from the DSD, and the DSD can refer to the HLBA table to determine the physical location of the data. When data is moved from one PBA to another, a table mapping PBA locations can be updated, while the HLBA can remain the same and repoint to a different PBA. For example, data can be assigned an HLBA, such as HLBA1, and can be mapped to location PBA1. The data located at PBA1, which can be located in a non-volatile solid state memory, may move to PBA2, which may be located on a track on a shingled band. The DSD can remap HLBA1 from PBA1 to PBA2 and update the mapping in a table (e.g. an HLBA table).

There may be times where not all of the PBAs are mapped to an HLBA. For example, referring to the system 300, tracks N 302 to track last-1 304 may be sequential, and can have an assigned HLBA. The last track 306, which may be an unassigned randomly writable track (e.g. cache track), may not have an assigned HLBA, but rather a drive accessible logical block address (DLBA), which may not be accessible to the host. Since the PBA of the cache tracks may not be accessible to the host, they may not be included in a reported drive capacity.

Figure 4:
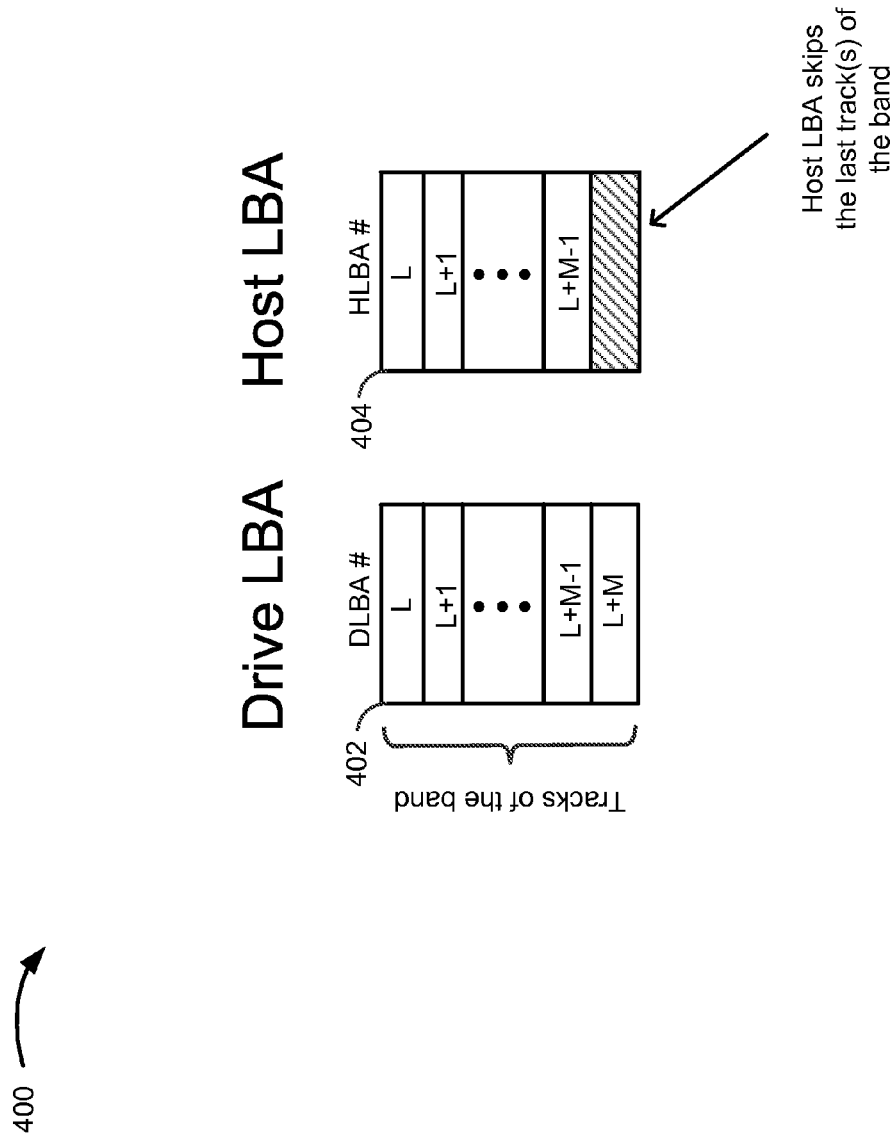
FIG. 4 is a diagram of a shingled band with a cache track, in accordance with certain embodiments of the present disclosure.

Referring to FIG. 4, a diagram of a shingled band with a cache track is shown and generally designated 400. The system 400 can be an example implementation of system 100. Drive accessible logical block addresses (DLBAs) can map to PBAs on sequential and unassigned randomly writable tracks (e.g. cache tracks), provided the DSD is configured to operate in a DLBA mode. Track allocation circuit(s) 112 can change an operating mode of the DSD from HLBA to DLBA so that cache data can be accessed. Data can be moved to and from the cache tracks to other locations in the DSD, including to tracks in the same band. Track allocation circuit(s) 112 can determine which data to move and when to move them, and the DSD can maintain a table in a memory (e.g. non-volatile solid state, disc memory, etc.) that can track which data are in the cache track(s). The drive can operate in HLBA or DLBA mode, or can switch between them on the fly, but can only access the cache track in DLBA mode; from the perspective of the host, the drive may be operating in HLBA mode irrespective of the actual mode setting.

A DLBA table can map PBAs in a band to DLBA values, whereas an HLBA table may not map to PBAs in the cache track. For example, a band can contain M tracks, including a cache track. The DLBA can map all of the tracks in the band 402; the first track may be mapped to DLBA L and the last track, the cache track, can be mapped to L+M. An HLBA can map only to data in non-cache tracks in the band 404, where the last track may be mapped to HLBA L+M−1 rather than L+M.

Figure 5:
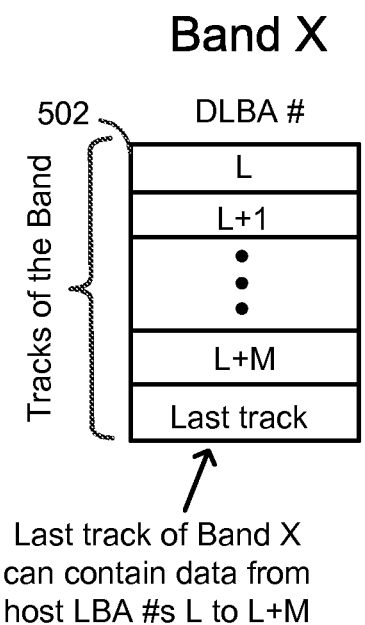
FIG. 5 is a diagram of a shingled band with a cache track, in accordance with certain embodiments of the present disclosure.

Referring to FIG. 5, a diagram of a shingled band with a cache track is shown and generally designated 500. The system 500 can be an example embodiment of system 400. Cache tracks can store data from PBAs accessible via the HLBA. For example, the cache track, which may be the last track, of Band X 502, can store data from the HLBA mapped PBAs. When the DSD is in DLBA mode, track allocation circuit(s) 112 can route data to, or retrieve data from the cache track even though the HLBA may point towards a different PDA. For example, a host may direct read and write commands to an HLBA, such as HLBA L. The track allocation circuit(s) 112 can change the mode from HLBA to DLBA, and then assign an HLBA to a DLBA having a physical address on the cache track; the assignments can be stored in a table. For example, the table may have an entry mapping HLBA L to DLBA Last track. There may still be data in the physical location mapped to HLBA L, but new data may be on the cache track. The cache data can overwrite, or merge with the data at the physical location of HLBA L.

The track allocation circuit(s) 112 may exclusively store data associated with HLBAs of the sequential tracks of a band to the cache track(s) of the band. For example, data associated the sequential tracks of Band X 502 (tracks L to L+M) may be stored only to the last track of Band X 502. In another example, the cache track of Band X 502 may only store data associated with the HLBAs of the sequential tracks of Band X 502. In another example, such as the examples shown in FIG. 2, the cache track 206 may be designated to only be allowed to cache data for Band A and the cache track 210 may be designated to only be allowed to cache data for Band B.

Figure 6:
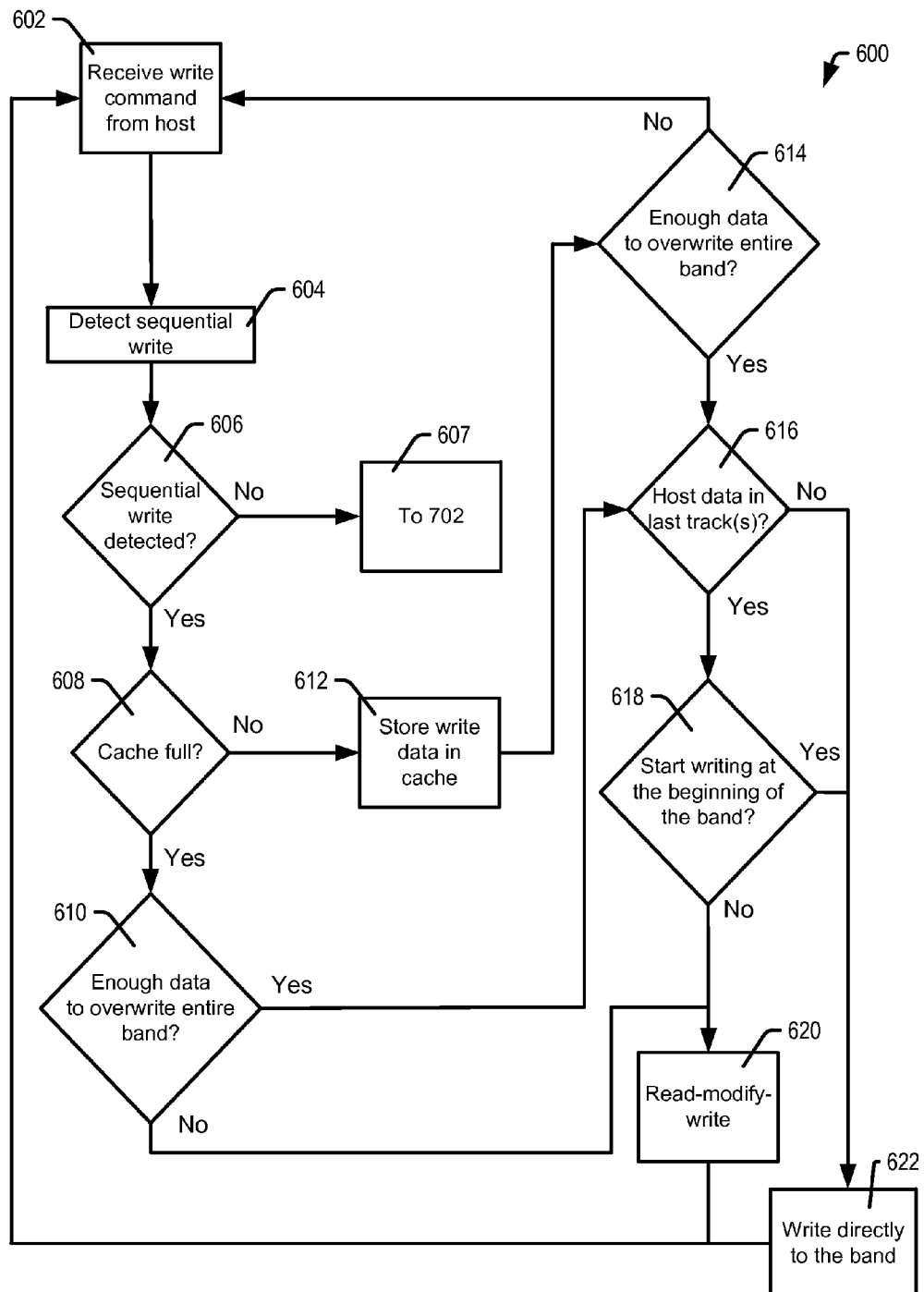
FIG. 6 is a flowchart of a method of a shingled band with a cache track, in accordance with certain embodiments of the present disclosure.
Figure 7:
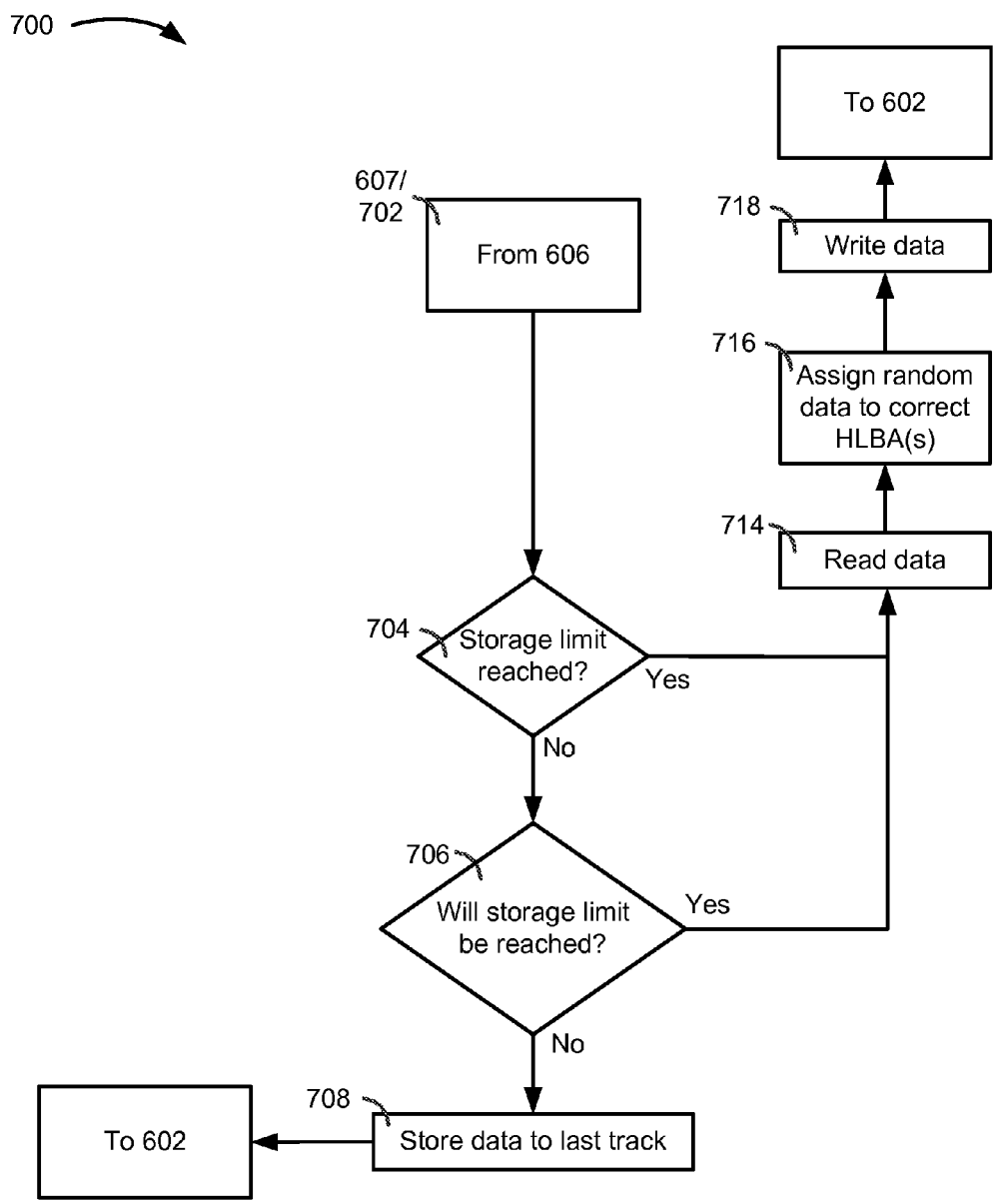
FIG. 7 is a flowchart of a method of a shingled band with a cache track, in accordance with certain embodiments of the present disclosure.

Referring to FIG. 6, a flowchart of a method of shingled band with a cache track is shown and generally designated 600. The method 600 can be an example implementation of systems 100 through 500. A data storage device (DSD) can receive a write command from a host at 602, which may contain instructions for a sequential or non-sequential write operation. The DSD can determine when the host command contains sequential instructions, at 604, via firmware, although this operation can be performed with other circuits, such as an R/W channel, a microprocessor, track allocation circuit(s), and so forth. When the controller detects a sequential write instruction at 606, a sequential write process can commence by determining when a cache, which may be a volatile memory, is substantially full at 608.

The DSD can store data to the cache, at 612, and can determine if there is enough cache data to overwrite (re-write) the entire band at 614, which may require a read-modify-write (RMW) operation; an RMW operation can include reading all of the data in the band into a cache (e.g. a media cache), modifying the data, and storing the modified data to the band, starting from the first track. RMW operations can be time and resource intensive and thus may not be desirable in situations where less than substantially all of the band can be overwritten with new data. When there is not enough data to substantially fill the band, the DSD can continue to receive host data until the cache is substantially filled, at which point, the controller can determine if there exists any data in the last track(s) of the band, such as random data, at 616.

When there is no data (e.g. host data) in the last track(s), at 616, the controller can direct storage circuits to store the data directly to the band at 622. Writing directly to the band can corrupt data tracks subsequent to the written track (see FIG. 2). When the writing ends at the last sequential track, the unassigned randomly writable track(s) could be corrupted, but this may not be an issue when the unassigned randomly writable track(s) do not contain data, or contain data the can be disregarded.

When data is in the last track, at 616, or writing starts at the beginning of the band, at 618, the controller can direct storage circuits to write data directly to the band at 622. When writing does not start at the beginning of the band, at 618, the band may be rewritten via an RMW process at 620.

The method 600 is but one embodiment of the method. In some embodiments, a controller (or microprocessor, an R/W channel, firmware, software, etc.) can determine when a band re-write would be more appropriate than a direct write at 622, and conversely, the controller can determine when direct write would be more advantageous than a re-write at 620.

When write commands from a host do not contain sequential write instructions, a random write process can begin, at 607/700 by determining when the track(s) allocated for cache data are full, at 704; in some embodiments, cache data tracks can store sequential, non-sequential, system, or other data. When the cache data track(s) are substantially full, DLBA mode can be enabled, a read-modify-write process can begin at 714, and is discussed in more detail later in this document.

When the last tracks are not substantially full, at 704, there may be room to store additional cache data. The controller can determine when there is storage space available to accommodate the additional data without exceeding a storage limit, at 706; the DSD can determine a storage limit (e.g. 100%, 75%, 50%, etc.), which may be predetermined prior to storing data to the last track, at which the last track can be considered full. In the event that there is sufficient room to store the data without substantially filling the unassigned randomly writable tracks, the controller can direct a next data to be stored to the last track(s), at 708. The information about the data stored within the unassigned randomly writable tracks can be stored in a table, which may be located in a protected area of the DSD (e.g. drive system area), and the DSD can continue to receive write commands at 602. At certain times, such as when the last track is determined to be full, the last track's data stored therein can be flushed, such as via a read-modify-write operation to the shingled portion of a band. The data can be flushed at other times also, such as during a period of inactivity or low activity of the DSD, or after a time period has expired, or upon another trigger such as power up or powered own of the DSD, or via other triggers to flush a cache.

The read-modify-write (RMW) process can begin by reading data from the entire band, including the sequential and unassigned randomly writable tracks, at 714. A controller (or microprocessor, firmware, R/W channel, etc.) can integrate the cache data with the HLBA data, at 718, and write the integrated data to HLBA mapped physical locations on the band. The DSD can continue receiving write commands from the host at 602.

Figure 8:
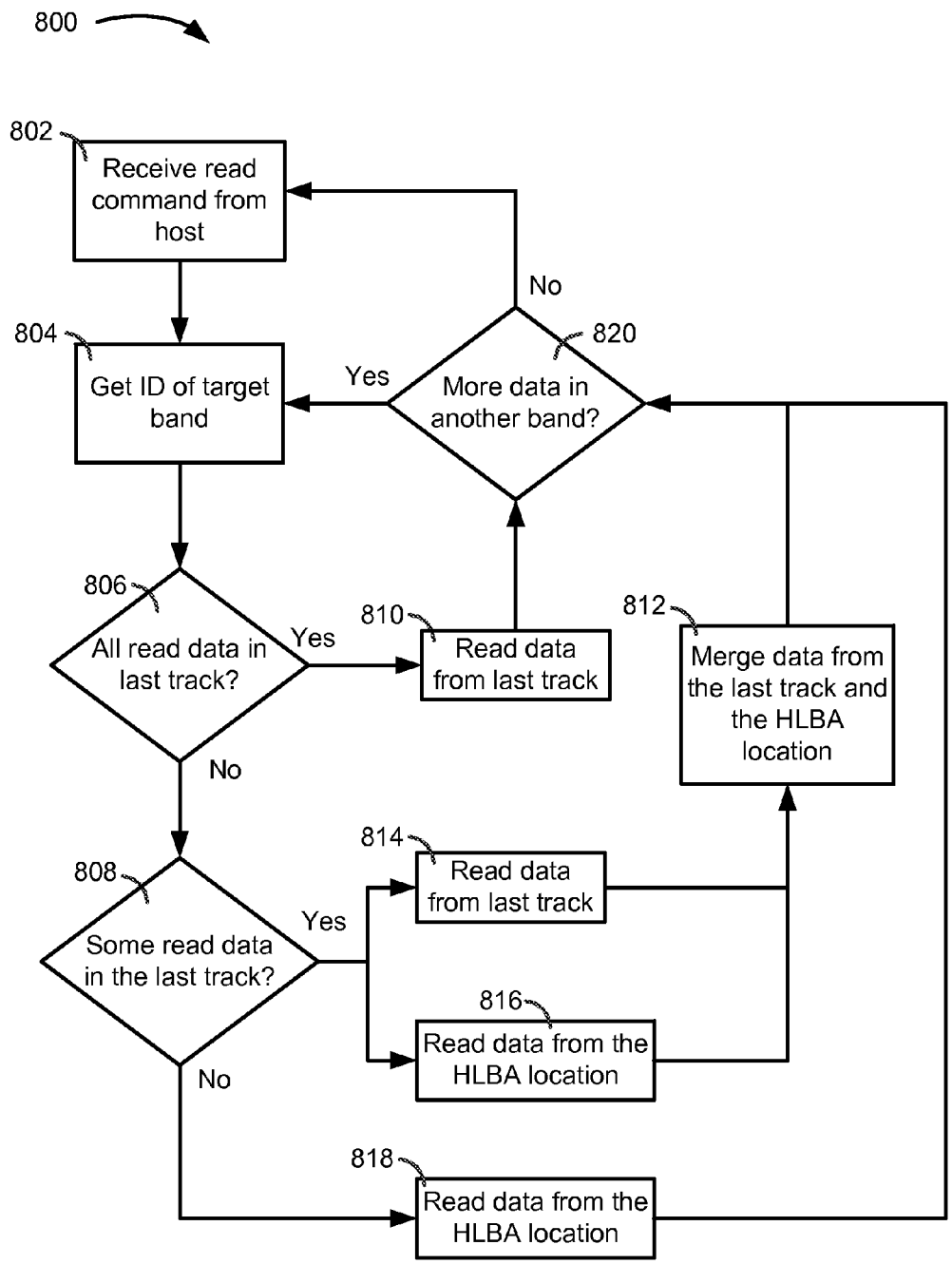
FIG. 8 is a flowchart of a method of a shingled band with a cache track, in accordance with certain embodiments of the present disclosure.

Referring to FIG. 8, a flowchart of a method of shingled band with a cache track is shown and generally designated 800. The method 800 can be an example implementation of systems 100 through 500. Data may be read from a band containing sequential and unassigned randomly writable tracks (e.g. cache tracks) by first receiving a read command from a host at 802. The controller (or R/W channel, microprocessor, firmware, etc.) can determine the target band at 804, and may also determine if any of the read data is located in the unassigned randomly writable tracks at 806. When the read data is wholly located on the unassigned randomly writable tracks, the DSD can read the targeted data from those tracks, at 810.

In some cases, not all of the read data may be located on the cache tracks. The controller can determine when some of the read data is located in the cache tracks or when all of the read data is located in sequential tracks, at 808. When all of the data is located on sequential tracks the DSD can simply read the data at 818.

When some of the data is in sequential tracks and unassigned randomly writable tracks, the DSD can read sequential data, at 816, and cache data 814. In some examples, the sequential and cache data can be read concurrently. In other examples, the sequential data may be read first, or the random data may be read first. The data from both track types can be merged and returned to a requestor (e.g. host, controller, another DSD, microprocessor, etc.) or stored in a memory, such as a cache, non-volatile solid state memory, volatile memory, disc memory, etc. When a controller determines that there is more read data in another band, at 820, the controller can determine the target band at 804. The read process can include steps not shown, including a step to transfer the read data from a cache to the requestor in order to make room in the cache for more data.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a data storage medium including a shingled band of tracks;
a track allocation circuit configured to:
    map at least one last track of the shingled band as a randomly writeable track that does not map to host accessible logical block addresses (HLBAs), and
    assign HLBAs to a shingled portion of the shingled band.

2. The apparatus of claim 1 further comprising:
the last track is randomly writeable and randomly accessible;
the track allocation circuit configured to:
    change an operating mode from an HLBA mode to a drive accessible logical block address (DLBA) mode to enable the data storage device to perform data operations on the randomly writable track; and
    store data intended for an HLBA to a DLBA of the randomly writable track.

3. The apparatus of claim 2 further comprising:
the track allocation circuit configured to:
    receive host data from a host intended for a targeted HLBA;
    map the targeted HLBA to a DLBA corresponding to a physical block address (PBA) in the randomly writable track; and
    store the host data to the randomly writable track via the targeted HLBA.

4. The apparatus of claim 3 further comprising:
the track allocation circuit configured to:
    determine if the randomly writable track is at a storage limit; and
    store next data to the randomly writable track when the randomly writable track is below the storage limit and adding the next data to the randomly writable track does not exceed the storage limit.

5. The apparatus of claim 4 further comprising:
the track allocation circuit configured to:
    when data stored in the randomly writable track exceeds the storage limit, the data in the randomly writable track is flushed.

6. The apparatus of claim 2 further comprising:
the track allocation circuit configured to:
    change the operating mode from the HLBA mode to the DLBA mode when cache data in the randomly writable track is to be accessed;
    read the cache data in the randomly writable track based on a requested HLBA; and
    provide the cache data to a host.

7. The apparatus of claim 6 further comprising:
the track allocation circuit configured to:
    receive a read command from the host;
    identify a target band corresponding to the read command;
    read data corresponding to the read command from only the randomly writable track when all of the data corresponding to the read command is on the randomly writable track;
    read the data corresponding to the read command from a HLBA location not in the randomly writeable track when not all of the data corresponding to the read command is in the randomly writable track; and
    provide the data corresponding to the read command to the host.

8. An apparatus comprising:
a data storage medium having a shingled band of tracks including:
    a shingled portion with at least one track partially overlapped by a following adjacent track;
    a last track that overlaps a preceding adjacent track but is not overlapped by a following adjacent track;
a circuit configured to:
    map host accessible logical block addresses (HLBAs) to the shingled portion; and
    map the last track as a randomly writable track that does not have HLBAs mapped thereto.

9. The apparatus of claim 8 further comprising:
the circuit configured to:
    change operating modes from an HLBA mode to a drive accessible logical block address (DLBA) mode to enable the data storage device to perform data operations on the randomly writable track; and
    store data associated with a HLBA to the randomly writable track.

10. The apparatus of claim 8 further comprising:
the last track is a data cache; and
a controller configured to store data to the last track.

11. The apparatus of claim 10 further comprising:
the last track is randomly writable and randomly accessible.

12. The apparatus of claim 11 further comprising:
the controller configured to remap data stored in the last track to HLBAs when the last track exceeds a predetermined storage limit.

13. The apparatus of claim 12 further comprising:
the controller configured to:
determine if a write command from a host includes sequential write instructions;
when the write command includes sequential write instructions, initiate a sequential write procedure; and
when the write command does not include sequential write instructions, enable the DLBA mode and determine if the host data stored in the randomly writable track is below the storage limit.

14. The apparatus of claim 8 further comprising:
the data storage medium having another shingled band of tracks with:
    a corresponding shingled portion with at least one track partially overlapped by a following adjacent track, the shingled portion having HLBAs mapped thereto; and
    a corresponding last track that overlaps a preceding adjacent track but is not overlapped by a following adjacent track, and the last track does not have HLBAs mapped thereto.

15. The apparatus of claim 14 further comprising:
a controller configured to:
    exclusively store data associated with HLBAs of the shingled portion to the last track of the shingled band; and
    exclusively store data associated with HLBAs of the corresponding shingled portion to the corresponding last track of the another shingled band.

16. A method comprising:
designating at least one last track of a shingled band of tracks on a data storage medium as a randomly writeable track that does not map to host accessible logical block addresses (HLBAs), and where a shingled portion of the shingled band of tracks has HLBAs assigned thereto; and store data intended for an HLBA to the randomly writeable track.

17. The method of claim 16 further comprising:

selecting an HLBA mode of operation when access to the randomly writable track is prohibited; and selecting a drive accessible logical block address (DLBA) mode of operation when access to the randomly writable track is limited to a data storage medium.

18. The method of claim 16 further comprising:

determine if the randomly writable track is at a storage limit; and store next data to the randomly writable track when the randomly writable track is below the storage limit and adding the next data to the randomly writable track does not exceed the storage limit.

19. The method of claim 16 further comprising:

determining if a write command from a host includes sequential write instructions;

when the write command includes at least one sequential write instruction, initiating a sequential write procedure; and when the write command does not include at least one sequential write instruction, enabling the DLBA mode and determining if the host data stored in the randomly writable track is below the storage limit.

20. The method of claim 16 further comprising:

receiving a read command from the host;

identifying a target band based on the read command;

reading read data from the randomly writable track when all of the read data is on the randomly writable track;

identifying a next target band based on the when there is more read data in at least one more band;

reading the read data from a target HLBA location when there is no read data in the randomly writable track;

reading the read data from the target HLBA location and from the randomly writable track when there is some read data in the randomly writable track; and merging the read data from the HLBA location with the read data from the randomly writable track.

* * * * *